(12) United States Patent
Nishida et al.

(10) Patent No.: US 9,511,625 B2
(45) Date of Patent: Dec. 6, 2016

(54) NON-PNEUMATIC TIRE

(71) Applicant: BRIDGESTONE CORPORATION, Chuo-ku, Tokyo (JP)

(72) Inventors: Masashi Nishida, Tokyo (JP); Akihiko Abe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/435,922

(22) PCT Filed: Oct. 18, 2013

(86) PCT No.: PCT/JP2013/078386
§ 371 (c)(1),
(2) Date: Apr. 15, 2015

(87) PCT Pub. No.: WO2014/061809
PCT Pub. Date: Apr. 24, 2014

(65) Prior Publication Data
US 2015/0273936 A1 Oct. 1, 2015

(30) Foreign Application Priority Data

Oct. 19, 2012 (JP) ................................ 2012-231879

(51) Int. Cl.
*B60B 9/04* (2006.01)
*B60C 7/18* (2006.01)
(Continued)

(52) U.S. Cl.
CPC . *B60B 9/04* (2013.01); *B60B 5/02* (2013.01); *B60B 9/26* (2013.01); *B60C 7/14* (2013.01); *B60C 7/18* (2013.01); *B60C 7/24* (2013.01); *B60C 2007/146* (2013.04)

(58) Field of Classification Search
CPC ............. B60B 9/04; B60B 9/10; B60B 9/12; B60B 9/26; B60C 7/10; B60C 7/102; B60C 7/14; B60C 7/24; B60C 7/18; B60C 7/12; B60C 2007/107; B60C 2007/146
See application file for complete search history.

(56) References Cited

U.S. PATENT DOCUMENTS 1,857,239 A * 5/1932 Dinaro ...................... B60B 9/04
152/22
5,313,994 A * 5/1994 Hill, III ................. B29D 30/02
152/301

(Continued)

FOREIGN PATENT DOCUMENTS

CN 1955018 A 5/2007
CN 102350923 A 2/2012

(Continued)

OTHER PUBLICATIONS

International Standard "therrmoplastic elastomers—Nomenclature and abbreviated terms", ISO 18064, First Edition, Sep. 1, 2003, 11 pages.

(Continued)

*Primary Examiner* — John Walters
*Assistant Examiner* — James Triggs
(74) *Attorney, Agent, or Firm* — Sughrue Mion, PLLC

(57) ABSTRACT

A non-pneumatic tire (1) is provided including an attachment body (11) attached to an axle, an outer rim body (13) configured to surround the attachment body (11) from the outside in the tire radial direction, and a connecting member (15) configured to connect the attachment body (11) and the outer rim body (13) in a displaceable manner, wherein, in the connecting member (15), a size of one end section (15a) connected to the outer rim body (13) in the tire width direction (H) is larger than a size of the other end section (15b) connected to the attachment body (11) in the tire width direction (H).

11 Claims, 10 Drawing Sheets

(51) Int. Cl.
*B60B 5/02* (2006.01)
*B60C 7/14* (2006.01)
*B60C 7/24* (2006.01)
*B60B 9/26* (2006.01)

(56) References Cited

U.S. PATENT DOCUMENTS

| | | | |
|---|---|---|---|
| 8,649,845 B2* | 2/2014 | McIntyre | A61N 1/36082 600/407 |
| 2011/0272254 A1* | 11/2011 | Anderfaas | B60B 9/26 198/780 |
| 2014/0251518 A1 | 9/2014 | Abe et al. | |
| 2014/0252528 A1* | 9/2014 | Yasuoka | H01L 31/0232 257/438 |

FOREIGN PATENT DOCUMENTS

| | | |
|---|---|---|
| JP | 58-36702 A | 3/1983 |
| JP | 04-221201 A | 8/1992 |
| JP | 2010-58556 A | 3/2010 |
| JP | 2011-25757 A | 2/2011 |
| JP | 2011-156905 A | 8/2011 |
| JP | 2011-156906 A | 8/2011 |
| JP | 2012-011973 A | 1/2012 |
| WO | 95/14582 A1 | 6/1995 |

OTHER PUBLICATIONS

International Search Report for PCT/JP2013/078386 dated Nov. 12, 2013 [PCT/ISA/210].
Written Opinion for PCT/JP2013/078386 dated Nov. 12, 2013 [PCT/ISA/237].

* cited by examiner

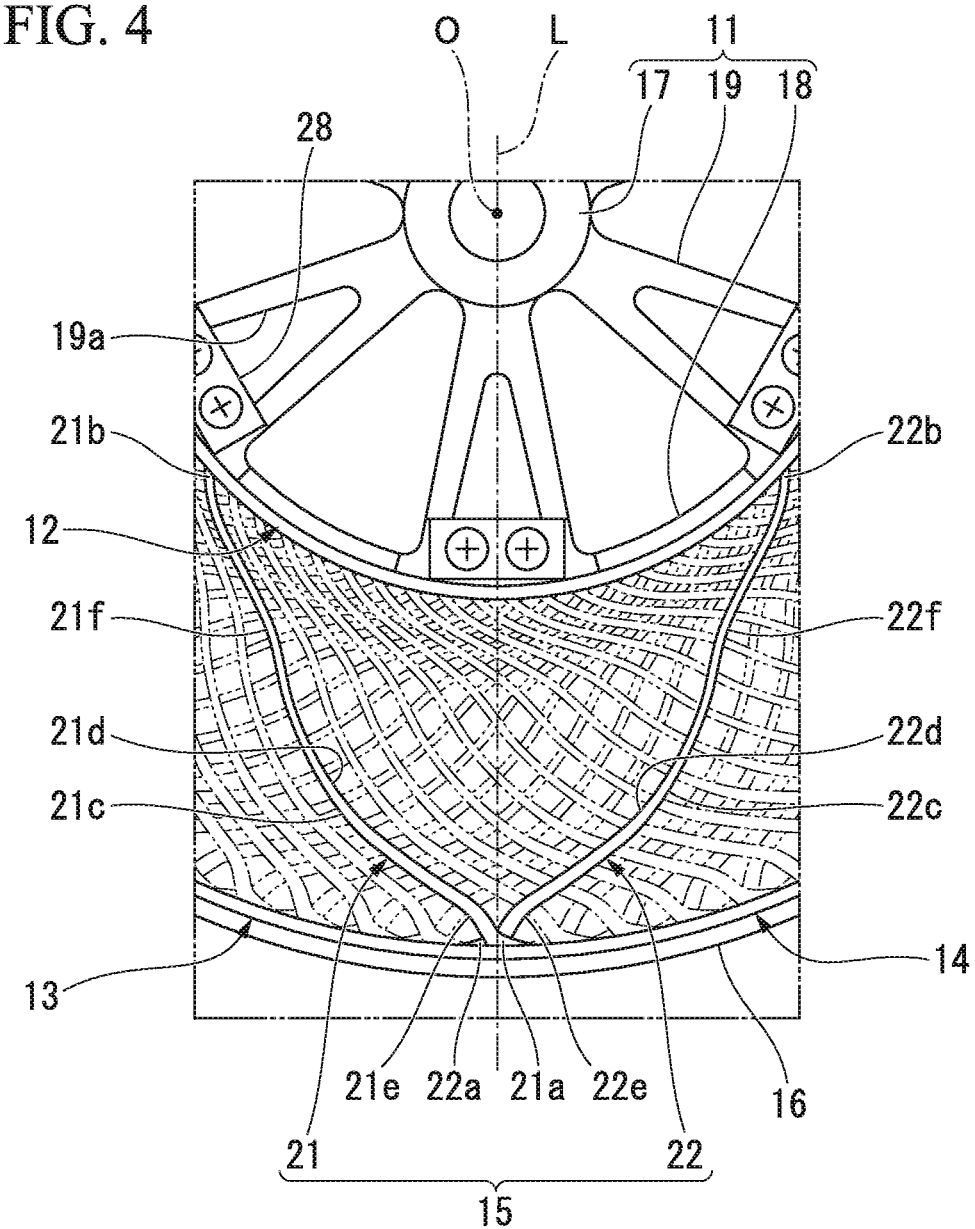

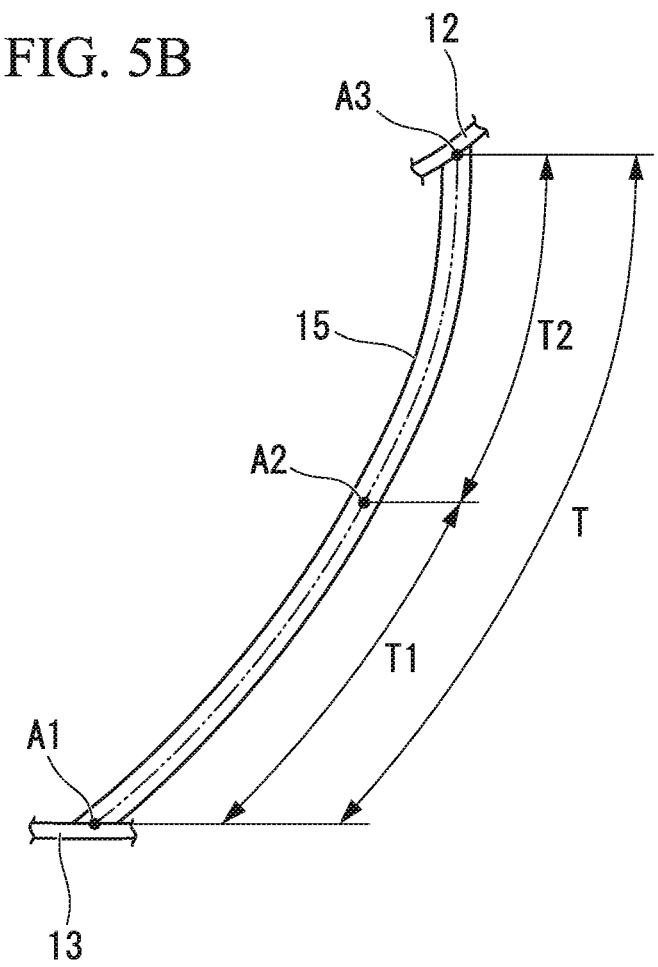

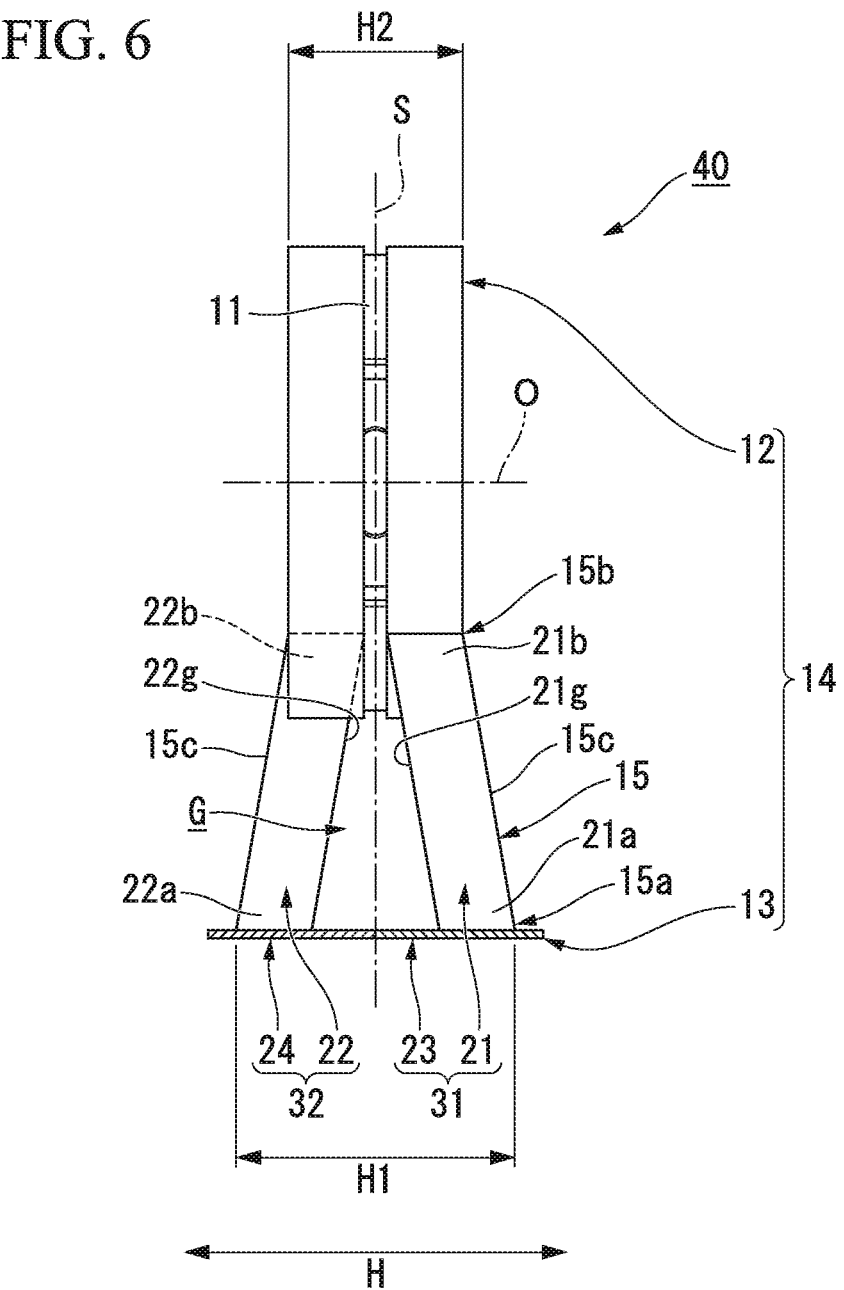

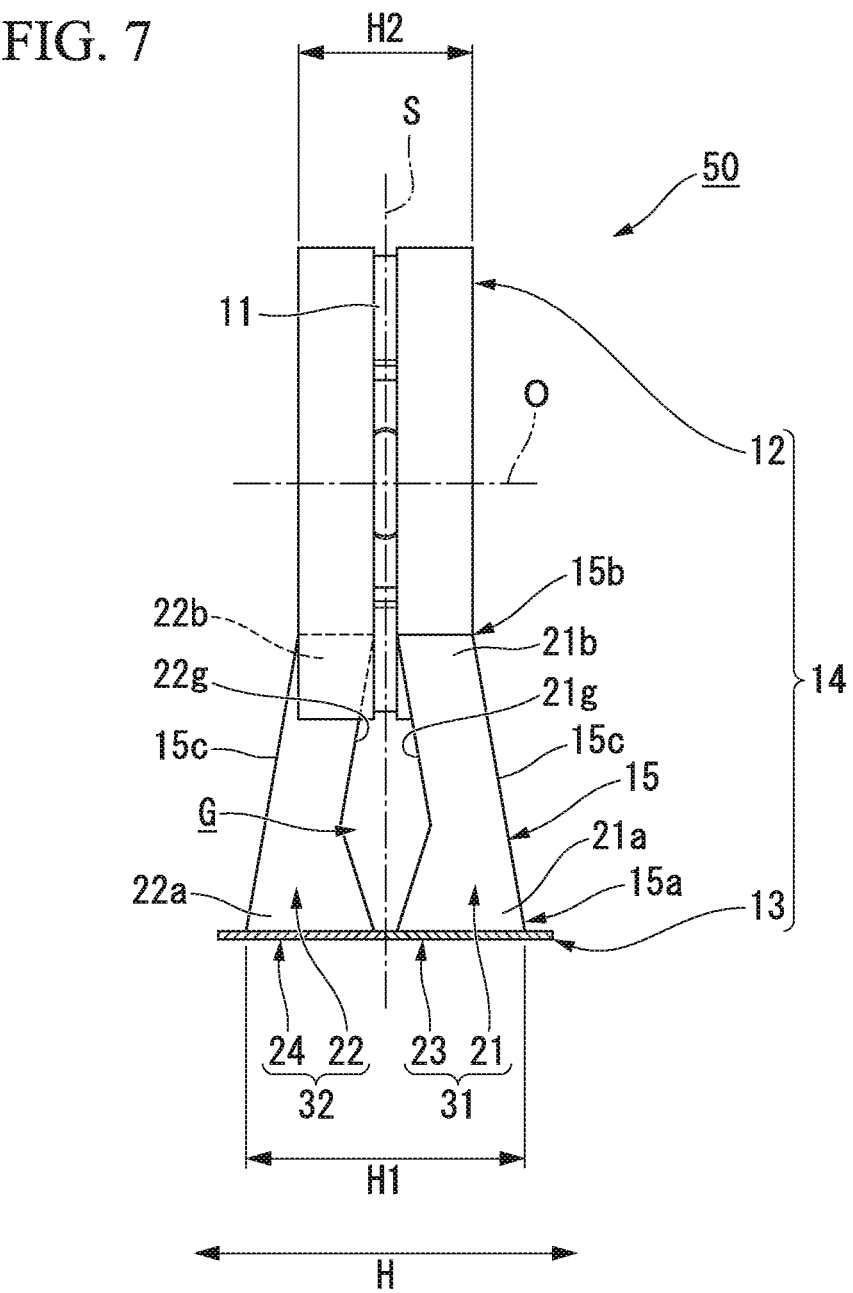

NON-PNEUMATIC TIRE

TECHNICAL FIELD

The present invention relates to a non-pneumatic tire in which pressurized air need not be filled upon use.

Priority is claimed on Japanese Patent Application No. 2012-231879, filed Oct. 19, 2012, the content of which is incorporated herein by reference.

BACKGROUND ART

In a pneumatic tire of the related art that is filled with pressurized air and used, occurrence of a blowout is a structurally unavoidable problem. In order to solve this problem, in recent years, for example, a non-pneumatic tire as disclosed in the following Patent Document 1 has been proposed.

DOCUMENT OF RELATED ART

Patent Document

[Patent Document 1] Japanese Unexamined Patent Application, First Publication No. 2011-156905

SUMMARY OF INVENTION

Technical Problem

However, in the non-pneumatic tire of the related art, guarantee of durability of an outer rim body installed at the non-pneumatic tire should be further improved while attempting a decrease in weight.

In consideration of the above-mentioned circumstances, the present invention is directed to provide a non-pneumatic tire capable of securing durability of the outer rim body while attempting a decrease in weight.

Solution to Problem

In a non-pneumatic tire of a first aspect according to the present invention, since a size of one end section of a connecting member in a tire width direction is larger than a size of the other end section of the connecting member in a tire width direction, a load applied to an outer rim body via an attachment body and the connecting member can be distributed in a wide range in the tire width direction, and the load can be suppressed from being concentrated on a portion of the outer rim body. Accordingly, durability of the outer rim body can be secured while reducing the weight of the connecting member and attempting a decrease in weight of the non-pneumatic tire.

In addition, since the size of the one end section of the connecting member in the tire width direction is larger than the size of the other end section of the connecting member in the tire width direction, the size of the outer rim body in the tire width direction can be increased while suppressing an increase in size of the attachment body in the tire width direction. Accordingly, brake performance can be improved while suppressing an increase in weight of the non-pneumatic tire.

In a non-pneumatic tire of a second aspect according to the present invention, in the first aspect, as the size of the connecting member in the tire width direction is gradually decreased from the one end section toward the other end section, a rib effect based on a shape of the connecting member is exhibited in the connecting member, and stiffness of the connecting member can be increased.

In addition, since the size of the connecting member in the tire width direction is gradually decreased from the one end section to the other end section of the connecting member, durability of the connecting member can be improved by preventing stress concentration from occurring on the outside edges of the connecting member in the tire width direction, the connecting member can be easily formed, and the weight of the connecting member can be further reduced.

In a non-pneumatic tire of a third aspect according to the present invention, in the first or second aspect, in both of the elastic connecting plates, as inside edges in the tire width direction are spaced apart from each other in the tire width direction, the weight inside the connecting member can be reduced, and the weight of the connecting member can be further reduced.

In a non-pneumatic tire of a fourth aspect according to the present invention, in the third aspect, in both of the elastic connecting plates, as an interval in the tire width direction of the inside edges in the tire width direction is gradually decreased from the one end section toward the other end section of the connecting member, durability of the connecting member can be improved by preventing stress concentration from occurring on the inside edges of the connecting member in the tire width direction, the connecting member can be easily formed, and the weight of the connecting member can be further reduced.

In a non-pneumatic tire of a fifth aspect according to the present invention, in any one of the first to fourth aspects, as the inner rim body is fitted onto the attachment body, when the non-pneumatic tire is manufactured, for example, the connecting body in which the inner rim body and the outer rim body are previously connected by the connecting member can be assembled to the attachment body, and the non-pneumatic tire can be easily manufactured.

In addition, since the size of the inner rim body in the tire width direction is smaller than the size of the outer rim body in the tire width direction, a decrease in weight of the inner rim body can be attempted, and an increase in weight of the non-pneumatic tire can be suppressed.

Effects of the Invention

According to the non-pneumatic tire of the present invention, durability of the outer rim body can be secured while attempting a decrease in weight.

BRIEF DESCRIPTION OF DRAWINGS

FIG. 4 is an enlarged view showing a major part of FIG. 2.

FIG. 5B is a side view of the part of the non-pneumatic tire shown in FIG. 5A.

FIG. 6 is a front view showing a part of a non-pneumatic tire of a second embodiment according to the present invention when seen from the outside in the tire radial direction.

FIG. 7 is a front view showing a part of a non-pneumatic tire of a third embodiment according to the present invention when seen from the outside in the tire radial direction.

DESCRIPTION OF EMBODIMENTS (First embodiment)

Figure 1:
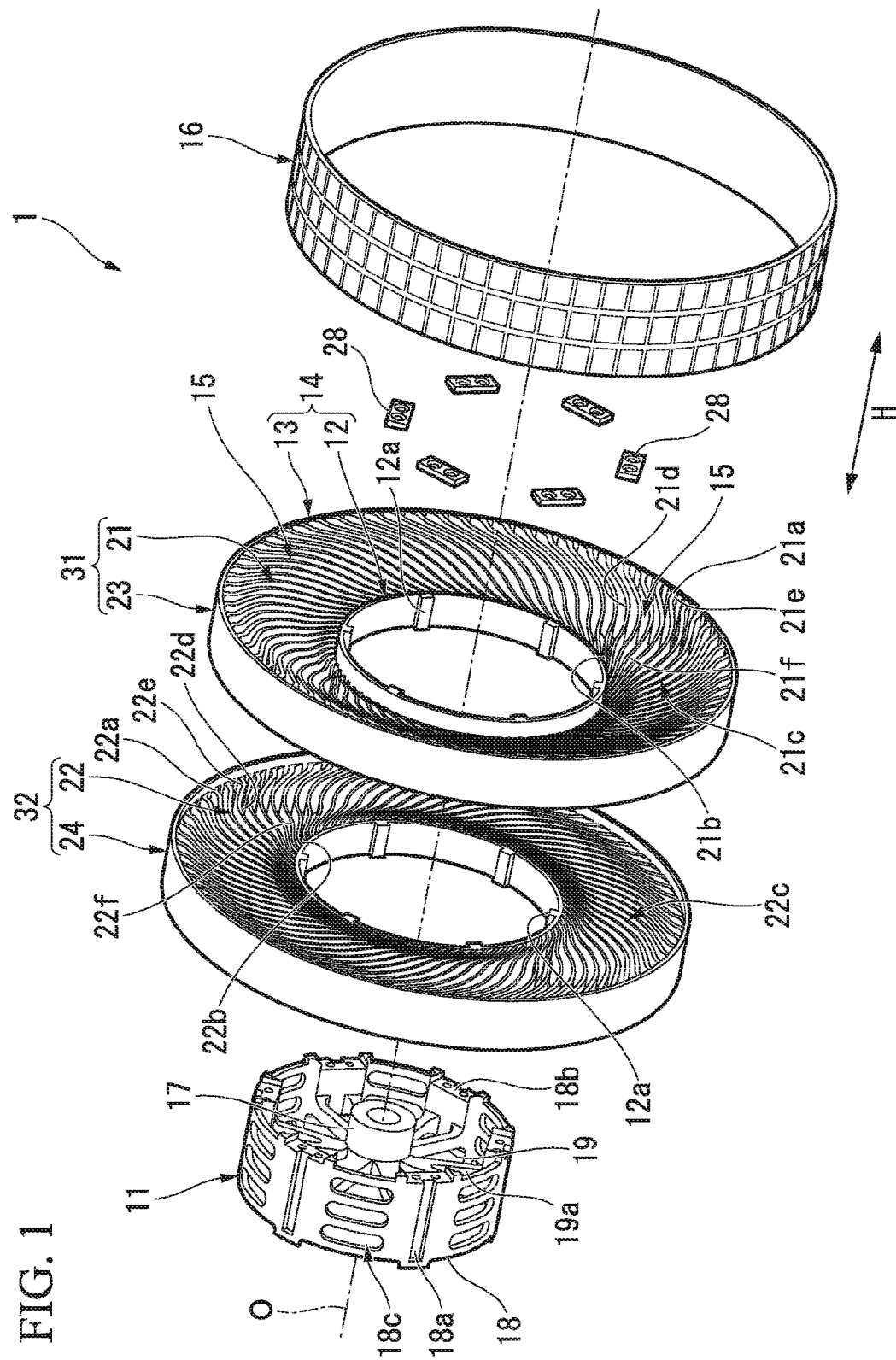
FIG. 1 is a partially exploded schematic perspective view of a non-pneumatic tire of a first embodiment according to the present invention.

Hereinafter, a first embodiment of a non-pneumatic tire according to the present invention will be described with reference to FIGS. 1 to 5B.

A non-pneumatic tire 1 includes an attachment body 11 attached to an axle (not shown), a ring member 14 including an inner rim body 12 fitted onto the attachment body 11 and an outer rim body 13 configured to surround the inner rim body 12 from the outside in a tire radial direction, a plurality of connecting members 15 disposed between the inner rim body 12 and the outer rim body 13 in a tire circumferential direction and configured to connect the rim bodies 12 and 13 in a relatively elastically displaceable manner, and a tread member 16 disposed at an outer circumferential surface side of the outer rim body 13 throughout the entire circumference.

Here, the attachment body 11, the inner rim body 12, the outer rim body 13 and the tread member 16 are disposed on the same axis as a common axis. Hereinafter, the common axis is referred to as an axis O, a direction along the axis O is referred to as a tire width direction H, a direction perpendicular to the axis O is referred to as a tire radial direction, and a direction around the axis O is referred to as a tire circumferential direction. Further, the attachment body 11, the inner rim body 12, the outer rim body 13 and the tread member 16 are disposed such that central sections in the tire width direction H coincide with each other.

In the ring member 14, the outer rim body 13 has a larger size in the tire width direction H, i.e., a larger width, than the inner rim body 12. The width of the inner rim body 12 is smaller than a width of the outer rim body 13, and equal to a width of the ring member 14. In addition, a plurality of ridge sections 12a protruding inward in the tire radial direction and extending throughout the entire length in the tire width direction H are disposed at an inner circumferential surface of the inner rim body 12 at intervals in the tire circumferential direction.

Figure 2:
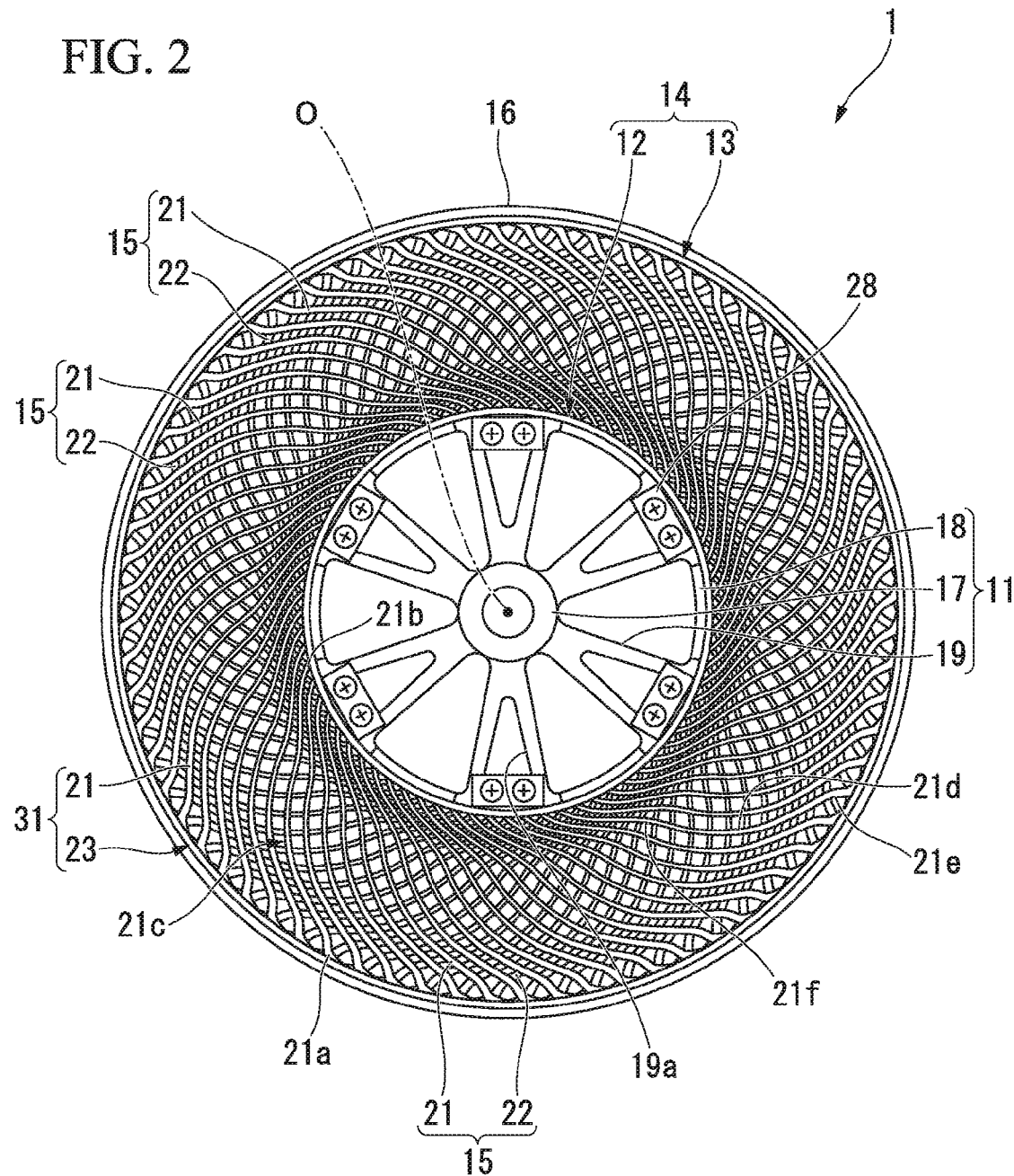
FIG. 2 is a side view of the tire when the non-pneumatic tire shown in FIG. 1 is seen from one side in a tire width direction.

As shown in FIGS. 1 and 2, the attachment body 11 includes a mounting rim section 17 on which a front end section of the axle is mounted, an outer ring section 18 configured to surround the mounting rim section 17 from the outside in the tire radial direction, and a plurality of ribs 19 configured to connect the mounting rim section 17 and the outer ring section 18.

The mounting rim section 17, the outer ring section 18 and the ribs 19 are integrally formed of a metal material such as an aluminum alloy or the like. The mounting rim section 17 and the outer ring section 18 are formed in a cylindrical shape and disposed on the same axis as the axis O. The plurality of ribs 19 are point-symmetrically disposed with respect to the axis O.

A plurality of key groove sections 18a concaved inward in the tire radial direction and extending in the tire width direction H are formed at an outer circumferential surface of the outer ring section 18 at intervals in the tire circumferential direction. In the outer circumferential surface of the outer ring section 18, the key groove sections 18a are opened at only one side of both ends of the tire width direction H and closed at the other side. The ridge sections 12a of the inner rim body 12 in the ring member 14 are separately fitted into the key groove sections 18a.

Further, wall surfaces that form the key groove section 18a are perpendicular to a pair of side wall surfaces opposite to each other in the tire circumferential direction and a bottom wall surface. In addition, outer surfaces of the ridge section 12a are perpendicular to the pair of side wall surfaces standing up from the inner circumferential surface of the inner rim body 12 and a top wall surface directed inward in the tire radial direction. Sizes of the ridge section 12a and the key groove section 18a in the tire circumferential direction are equal to each other.

Here, in an edge of one side of the outer ring section 18 in the tire width direction H, concave sections 18b concaved toward the other side in the tire width direction H and into which plate members 28 are fitted are formed at positions corresponding to the key groove sections 18a. Through-holes are formed in the plate members 28, and in the wall surfaces that form the concave sections 18b, female screw sections in communication with the through-holes of the plate members 28 fitted into the concave sections 18b are formed in the wall surface facing the one side in the tire width direction H. Further, the plurality of female screw sections and the plurality of through-holes are formed at intervals in the tire circumferential direction.

Then, the ring member 14 is fixed to the attachment body 11 by threadedly engaging a bolt with a female screw section through a through-hole of the plate member 28 fitted into the concave section 18b in a state in which the inner rim body 12 is fitted onto the attachment body 11 and the ridge section 12a is fitted into the key groove section 18a. In this state, the ridge section 12a is sandwiched in the tire width direction H between the plate member 28 and the other end wall surface disposed at the other end in the tire width direction H and directed toward one side, in the wall surfaces that form the concave section 18b.

Further, a plurality of hole arrays 18c, in each of which a plurality of weight-reducing holes passing in the tire radial direction are disposed at intervals in the tire width direction H, are formed at a portion of the outer ring section 18 disposed between the key groove sections 18a neighboring in the tire circumferential direction at intervals in the tire circumferential direction. In addition, weight-reducing holes 19a passing in the tire width direction H are also formed in the ribs 19.

The tread member 16 is formed in a cylindrical shape, and integrally covers the outer circumferential surface of the outer rim body 13 of the ring member 14 throughout the entire region. The tread member 16 is formed of, for example, natural rubber or/and vulcanized rubber in which a rubber composition is vulcanized, a thermoplastic material, or the like. For example, a thermoplastic elastomer, a thermoplastic resin, or the like is provided as the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber cross-linked body (TPV), or another thermoplastic elastomer (TPZ) or the like, defined by Japanese Industrial Standards JIS K6418, is provided as the thermoplastic elastomer. For example, a urethane resin, an olefin resin, a polyvinyl chloride resin, a polyamide resin, or the like, is provided as the thermoplastic resin. Further, in view of an abrasion resistance property, the tread member 16 may be formed of the vulcanized rubber.

The connecting member 15 connects the attachment body 11 and the outer rim body 13 in a relatively elastically displaceable manner.

The connecting member 15 is connected to the attachment body 11 via the inner rim body 12. The connecting member 15 includes a first elastic connecting plate 21 and a second elastic connecting plate 22 configured to connect the inner rim body 12 and the outer rim body 13 to each other in the ring member 14.

The plurality of (in the example shown, 60) connecting members 15 are installed in the tire circumferential direction such that the plurality of first elastic connecting plates 21 are disposed in the tire circumferential direction at predetermined one positions in the tire width direction H, and the plurality of second elastic connecting plates 22 are disposed in the tire circumferential direction at other positions in the tire width direction H different from the predetermined one positions in the tire width direction H.

That is, the plurality of first elastic connecting plates 21 are disposed in the tire circumferential direction at the same positions in the tire width direction H, and the plurality of second elastic connecting plates 22 are disposed in the tire circumferential direction at the same positions in the tire width direction H spaced apart from the first elastic connecting plate 21 in the tire width direction H. The first elastic connecting plate 21 and the second elastic connecting plate 22 are disposed at positions separated from each other in the tire width direction H, the first elastic connecting plate 21 is disposed at one side in the tire width direction H, and the second elastic connecting plate 22 is disposed at the other side in the tire width direction H.

Further, the plurality of connecting members 15 are disposed at positions point-symmetrical with respect to the axis O between the inner rim body 12 and the outer rim body 13 in the ring member 14. In addition, all the connecting members 15 have the same shape and the same size.

Additionally, the first elastic connecting plates 21 neighboring in the tire circumferential direction are not in contact with each other, and the second elastic connecting plates 22 neighboring in the tire circumferential direction are not in contact with each other. Further, the first elastic connecting plates 21 and the second elastic connecting plates 22 neighboring in the tire width direction H are not in contact with each other.

Here, one end section 21a of the first elastic connecting plate 21 connected to the outer rim body 13 is disposed closer to one side in the tire circumferential direction than the other end section 21b connected to the inner rim body 12, and one end section 22a of the second elastic connecting plate 22 connected to the outer rim body 13 is disposed closer to the other side in the tire circumferential direction than the other end section 22b connected to the inner rim body 12.

In addition, the one end sections 21a and 22a of the first elastic connecting plate 21 and the second elastic connecting plate 22 in the one connecting member 15 are disposed on the inner circumferential surface of the outer rim body 13 at different positions in the tire width direction H, and connected at the same position in the tire circumferential direction.

In the example shown, a plurality of curved sections 21d to 21f and 22d to 22f curved in the tire circumferential direction are formed at intermediate portions 21c and 22c disposed between the one end sections 21a and 22a and the other end sections 21b and 22b of the first elastic connecting plate 21 and the second elastic connecting plate 22 in a direction in which the connecting plates 21 and 22 extend in a side view of the tire when the tire 1 is seen from the tire width direction H. In both of the connecting plates 21 and 22, curve directions of the curved sections 21d to 21f and 22d to 22f neighboring in the above-mentioned extending direction in the plurality of curved sections 21d to 21f and 22d to 22f are opposite to each other.

The plurality of curved sections 21d to 21f formed at the first connecting plate 21 have the first curved section 21d curved to protrude toward the other side in the tire circumferential direction, the second curved section 21e disposed between the first curved section 21d and the one end section 21a and curved to protrude toward one side in the tire circumferential direction, and the third curved section 21f disposed between the first curved section 21d and the other end section 21b and curved to protrude toward one side in the tire circumferential direction.

The plurality of curved sections 22d to 22f formed at the second elastic connecting plate 22 have the first curved section 22d curved to protrude toward one side in the tire circumferential direction, the second curved section 22e disposed between the first curved section 22d and the one end section 22a and curved to protrude toward the other side in the tire circumferential direction, and the third curved section 22f disposed between the first curved section 22d and the other end section 22b and curved to protrude toward the other side in the tire circumferential direction.

In the example shown, the first curved sections 21d and 22d have a larger radius of curvature when seen in the side view of the tire than the second curved sections 21e and 22e and the third curved sections 21f and 22f. Further, the first curved sections 21d and 22d are disposed at central sections in a direction in which the first connecting plate 21 and the second elastic connecting plate 22 extend.

Further, lengths of both of the elastic connecting plates 21 and 22 are equal to each other, and as shown in FIG. 4, the other end sections 21b and 22b of both of the elastic connecting plates 21 and 22 are connected to one side and the other side in the tire circumferential direction about the axis O at positions spaced apart from positions in the tire radial direction opposite to the one end sections 21a and 22a in the outer circumferential surface of the inner rim body 12 at the same angle interval (for example, 20° to 135°) when seen in the side view of the tire. In addition, the first curved sections 21d and 22d, the second curved sections 21e and 22e and the third curved sections 21f and 22f of the first elastic connecting plate 21 and the second elastic connecting plate 22 protrude in opposite directions in the tire circumferential direction and have the same size.

Accordingly, as shown in FIG. 4, a shape of each of the connecting members 15 in the side view of the tire extends in the tire radial direction, and is line-symmetrical with respect to an imaginary line L passing the one end sections 21a and 22a of both of the connecting plates 21 and 22.

In addition, in both of the elastic connecting plates 21 and 22, one end side portions formed from a central section to the one end sections 21a and 22a in the above-mentioned extension direction have a larger thickness than the other end side portions formed from the central section to the other end sections 21b and 22b. Accordingly, strength of one end side portion at which a larger load in the first and second elastic connecting plates 21 and 22 is easily applied can be increased while suppressing an increase in weight of the connecting member 15 and securing flexibility of the connecting member 15. Further, the one end side portions and the other end side portions are smoothly joined to each other with no step. Further, the first elastic connecting plate 21 and the second elastic connecting plate 22 also have the same thickness.

Figure 5A:
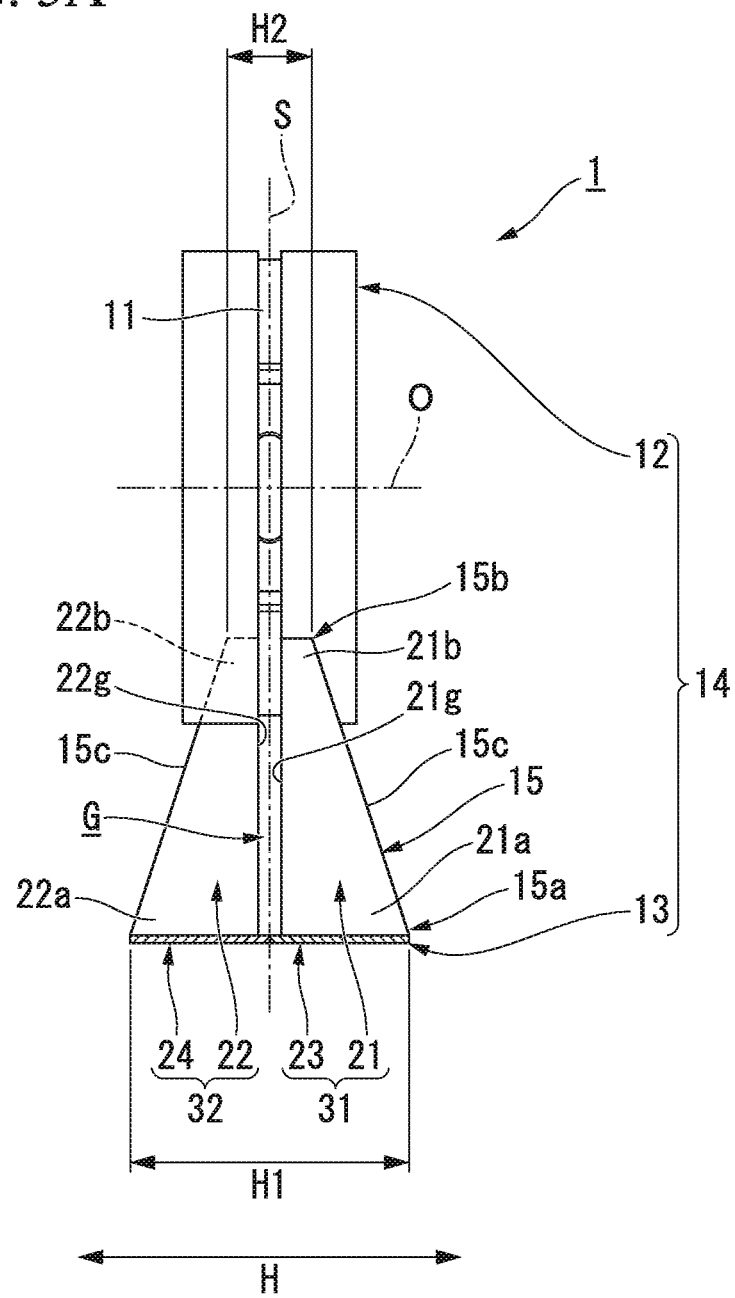
FIG. 5A is a front view showing a part of the non-pneumatic tire shown in FIG. 1 when seen from the outside in the tire radial direction.

As shown in FIG. 5A, a central section of the connecting member 15 in the tire width direction H coincides with a central section of the outer rim body 13 in the tire width direction H. The connecting members 15 are perpendicular to the axis O and line-symmetrical with respect to a reference line S passing the central section of the outer rim body 13 in the tire width direction H in a front view when the connecting member 15 is seen from a direction perpendicular to both of the axis O and the imaginary line L.

A size of the connecting member 15 in the tire width direction H (a length of the connecting member in the tire width direction) is smaller than a size of the outer rim body 13 in the tire width direction H. A size of the connecting member 15 in the tire width direction H is a distance in the tire width direction H between both of outside edges 15c of the connecting member 15 in the tire width direction H. The outside edges 15c of the connecting member 15 in the tire width direction H are outside edges of both of the elastic connecting plates 21 and 22 in the tire width direction H.

A size of the connecting member 15 in the tire width direction H is gradually decreased from one end section 15a toward the other end section 15b of the connecting member 15. Both of the outside edges 15c of the connecting member 15 in the tire width direction H are gradually directed inward in the tire width direction H from the one end section 15a toward the other end section 15b of the connecting member 15, and smoothly extend with no step. Both of the outside edges 15c of the connecting member 15 in the tire width direction H are linearly formed to be inclined with respect to the reference line S when seen in the front view.

In the embodiment, in the connecting member 15, a size H1 of the one end section 15a connected to the outer rim body 13 in the tire width direction H (a length of the one end section in the tire width direction) is smaller than a size H2 of the other end section 15b connected to the attachment body 11 in the tire width direction H (a length of the other end section in the tire width direction). In addition, the size H2 of the other end section 15b in the tire width direction H is larger than 40% of the size H1 of the one end section 15a of the connecting member 15 in the tire width direction H (0.4H1<H2<H1). When the size H1 of the one end section 15a of the connecting member 15 in the tire width direction H is larger than the size H2 of the other end section 15b in the tire width direction H, an inner circumferential width and a wheel width are increased, and an assembly weight (ASSY weight) is increased.

When the size H2 of the other end section 15b in the tire width direction H is 40% or less of the size H1 of the one end section 15a of the connecting member 15 in the tire width direction H, strength of the connecting member 15 is decreased.

The size H1 of the one end section 15a of the connecting member 15 in the tire width direction H is equal to the size of the outer rim body 13 in the tire width direction H. The size H2 of the other end section 15b of the connecting member 15 in the tire width direction H is smaller than both of the size of the inner rim body 12 in the tire width direction H and the size of the attachment body 11 in the tire width direction H.

The size H1 of the one end section 15a of the connecting member 15 in the tire width direction H is half the size of the outer rim body 13 in the tire width direction H or more. In addition, the size H1 of the one end section 15a of the connecting member 15 in the tire width direction H is a size of the outer rim body 13 in the tire width direction H or less (0.5H≤H1≤H). When the size H1 of the one end section 15a of the connecting member 15 in the tire width direction H is smaller than half the size of the outer rim body 13 in the tire width direction H, strength of the connecting member 15 is reduced. When the size H1 of the one end section 15a of the connecting member 15 in the tire width direction H is larger than the size of the outer rim body 13 in the tire width direction H, the weight of the connecting member 15 is increased.

In addition, as shown in FIG. 5B, in the entire length of the connecting member 15 in a plate thickness direction, a length from a point A1 to a point A3 of FIG. 2B is defined as T, a length from the point A1 to a point A2 is defined as T1, and a length from the point A2 to the point A3 is defined as T2. In this case, the length T1 from the point A1 to the point A2 is larger than 20% of the length T from the point A1 to the point A3, and equal to the length T when at its longest (0.2T≤T1≤T). When the length T1 from the point A1 to the point A2 approaches the length T, strength of the connecting member 15 is increased. When the length T1 from the point A1 to the point A2 is smaller than 20% of the length T from the point A1 to the point A3, strength of the outer circumference ring is decreased.

Here, in both of the elastic connecting plates 21 and 22 of the connecting member 15, inside edges 21g and 22g in the tire width direction H are spaced apart from each other in the tire width direction H. In both of the elastic connecting plates 21 and 22, intervals in the tire width direction H of the inside edges 21g and 22g in the tire width direction H are equal from the one end section 15a to the other end section 15b of the connecting member 15 throughout the entire length. In the front view, the inside edges 21g and 22g of both of the elastic connecting plates 21 and 22 in the tire width direction H are formed in a linear shape extending parallel to the reference line S, and smoothly extend with no step. In the front view, a spacing gap G in the tire width direction H is formed between the elastic connecting plates 21 and 22 from the one end section 15a to the other end section 15b of the connecting member 15 throughout the entire length.

Here, in the embodiment, the ring member 14 and the plurality of connecting members 15 are integrally formed with each other.

Further, in the embodiment, as shown in FIG. 1, the ring member 14 is split into one side split ring member 23 disposed at one side in the tire width direction H, and the other side split ring member 24 disposed at the other side in the tire width direction H. Further, in the example shown, the ring member 14 is split at the central section in the tire width direction H.

Then, the one side split ring member 23 is integrally formed with the first elastic connecting plate 21, and the other side split ring member 24 is integrally formed with the second elastic connecting plate 22.

Further, in the embodiment, the one side split ring member 23 and the first elastic connecting plate 21 are integrally formed through casting or injection molding, as are the other side split ring member 24 and the second elastic connecting plate 22.

Hereinafter, a member obtained by integrally forming the one side split ring member 23 and the first elastic connecting plate 21 is referred to as a first split case body 31, and a member obtained by integrally forming the other side split ring member 24 and the second elastic connecting plate 22 is referred to as a second split case body 32.

Here, the injection molding may be a general method of simultaneously forming both of the entire first and second split case bodies 31 and 32, and in the first and second split case bodies 31 and 32, one of the one and the other split ring members 23 and 24 and the first and second elastic connecting plates 21 and 22 may be an insert product, and the other may be an insert molding product formed through injection molding, a so-called two color formation, or the like.

In addition, in the first and second split case bodies 31 and 32, the one and the other side split ring members 23 and 24, and the first and second elastic connecting plates 21 and 22 may be formed of different materials, or may be formed of the same material. Further, the material may be a metal material, a resin material, or the like, and may preferably be a resin material, in particular, a thermoplastic resin in view of reduction in weight.

Further, when both of the first and second split case bodies 31 and 32 are separately and simultaneously injection-molded, the plurality of ridge sections 12a formed at the inner rim body 12 may be a gate portion.

As shown in FIG. 5A, in the first and second split case bodies 31 and 32, the inside edges of the first and second elastic connecting plates 21 and 22 in the tire width direction H coincide with the inside edges 21g and 22g of the inner rim body 12 in the tire width direction H. In the first and second split case bodies 31 and 32, the inner rim body 12 has a smaller width than the outer rim body 13.

Then, inside edges of the outer rim body 13 of the one side split ring member 23 and the outer rim body 13 of the other side split ring member 24 in the tire width direction H are connected by, for example, welding, fusion, adhesion, or the like. Further, among these, in the case of welding, for example, hot plate welding or the like may be employed.

In addition, inside edges of the inner rim body 12 of the one side split ring member 23 and the inner rim body 12 of the other side split ring member 24 in the tire width direction H are spaced apart from each other in the tire width direction H.

Accordingly, generation of burrs on the inner circumferential surface of the inner rim body 12 fitted onto the attachment body 11 is prevented.

Figure 3:
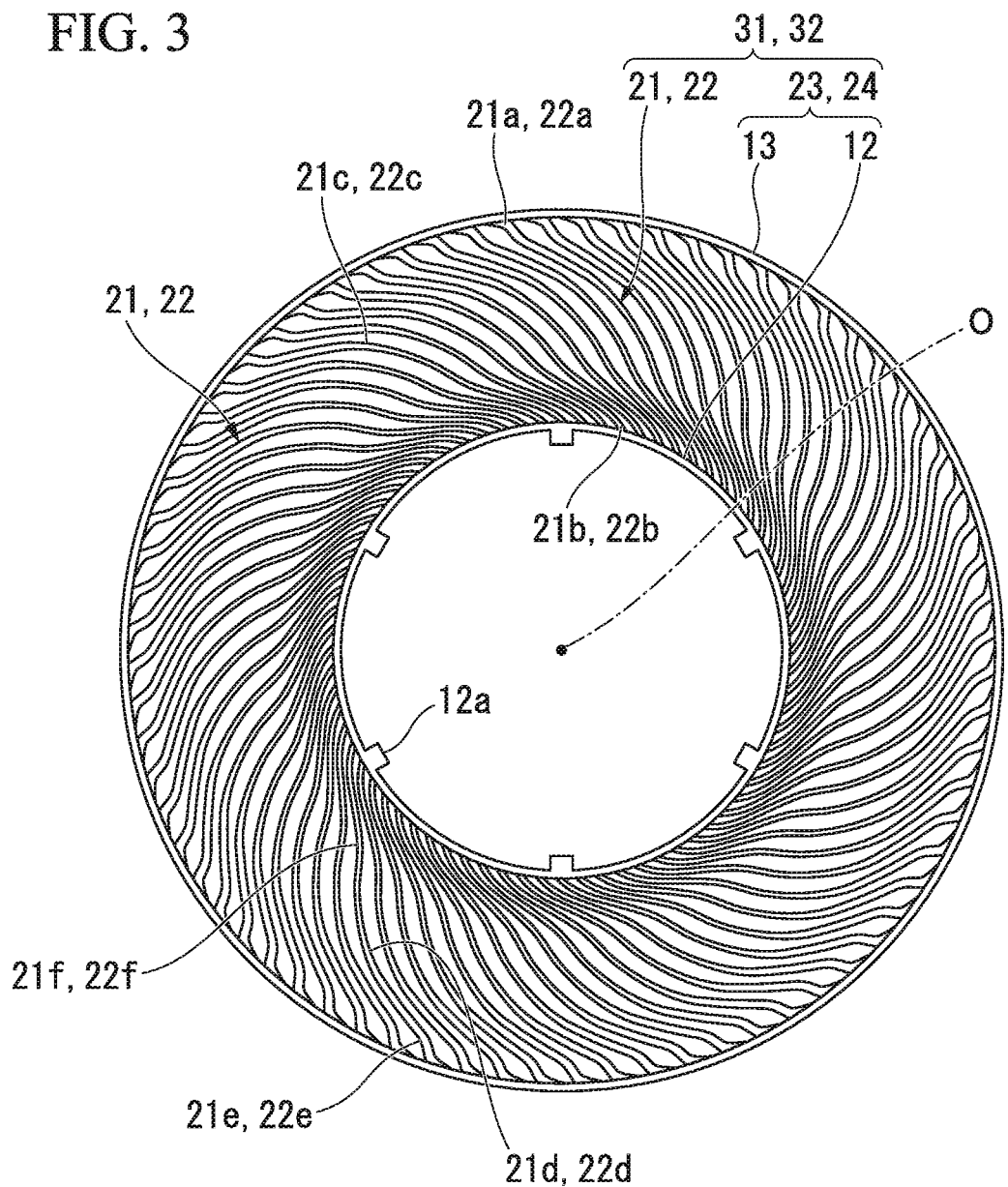
FIG. 3 is a plan view of a first split case body obtained by integrally forming one side split ring member and a first elastic connecting plate of the non-pneumatic tire shown in FIG. 1 when seen from the one side in the tire width direction, or a plan view of a second split case body obtained by integrally forming the other side split ring member and a second elastic connecting plate when seen from the other side in the tire width direction.

In addition, the first split case body 31 and the second split case body 32 have the same shape and the same size as shown in FIG. 3 in a state before the case bodies 31 and 32 are connected as described above.

Then, when the split case bodies 31 and 32 are connected as described above, as the edges of the outer rim bodies 13 of the first split case body 31 and the second split case body 32 in the tire width direction H match to be connected to each other in a state in which directions of both of the split case bodies 31 and 32 in the tire width direction H are opposite to each other while matching the positions of the first split case body 31 and the second split case body 32 in the tire circumferential direction such that the connecting members 15 are line-symmetrical to each other as described above in the side view of the tire, the non-pneumatic tire 1 is obtained.

As described above, according to the non-pneumatic tire 1 of the embodiment, since the size H1 of the one end section 15a of the connecting member 15 in the tire width direction H is larger than the size H2 of the other end section 15b of the connecting member 15 in the tire width direction H, a load applied to the outer rim body 13 via the attachment body 11 and the connecting member 15 is distributed in a wide range in the tire width direction H, and the load can be suppressed from being concentrated on a portion of the outer rim body 13. Accordingly, durability of the outer rim body 13 can be secured while reducing the weight of the connecting member 15 and attempting a decrease in weight of the non-pneumatic tire 1.

In addition, since the size H1 of the one end section 15a of the connecting member 15 in the tire width direction H is larger than the size H2 of the other end section 15b of the connecting member 15 in the tire width direction H, the outer rim body 13 can be increased in the tire width direction H while suppressing an increase in size of the attachment body 11 in the tire width direction H. Accordingly, brake performance can be improved while suppressing an increase in weight of the non-pneumatic tire 1.

In addition, since the size of the connecting member 15 in the tire width direction H is gradually reduced from the one end section 15a toward the other end section 15b of the connecting member 15, a rib effect based on a shape of the connecting member 15 can be exhibited to the connecting member 15, and stiffness of the connecting member 15 can be increased.

In addition, since the size of the connecting member 15 in the tire width direction H is gradually reduced from the one end section 15a toward the other end section 15b of the connecting member 15, durability of the connecting member 15 can be improved by preventing stress concentration from occurring on both of the edges 15c of the connecting member 15 in the tire width direction H, the connecting member 15 can be easily formed, and the weight of the connecting member 15 can be further reduced.

In addition, since the inside edges 21g and 22g of both of the elastic connecting plates 21 and 22 in the tire width direction H are spaced apart from each other in the tire width direction H, the weight inside the connecting member 15 can be reduced, and the weight of the connecting member 15 can be further reduced.

Further, since the inner rim body 12 is fitted onto the attachment body 11, when the non-pneumatic tire 1 is manufactured, for example, assembly of the split case bodies 31 and 32 (connecting bodies) in which the inner rim body 12 and the outer rim body 13 are previously connected to the attachment body 11 by the connecting members 15 becomes possible, and the non-pneumatic tire 1 can be easily manufactured.

In addition, since the size of the inner rim body 12 in the tire width direction H is smaller than the size of the outer rim body 13 in the tire width direction H, a decrease in weight of the inner rim body 12 becomes possible, and an increase in weight of the non-pneumatic tire 1 can be suppressed.

In addition, since the first split case body 31 obtained by integrally forming the one side split ring member 23 and the first elastic connecting plate 21 with each other and the second split case body 32 obtained by integrally forming the other side split ring member 24 and the second elastic connecting plate 22 with each other are provided, when the non-pneumatic tire 1 is assembled, even when both of the end sections 21a, 22a, 21b and 22b of the plurality of connecting members 15 are separately connected to the inner rim body 12 and the outer rim body 13, since it is sufficient if the first and second split case bodies 31 and 32 are mounted on the attachment body 11, manufacturing time can be reduced.

In addition, since the first and second split case bodies 31 and 32 are provided, for example, an increase in weight can be suppressed in comparison with the case in which both of the end sections 21a, 22a, 21b and 22b of the connecting members 15, the inner rim body 12 and the outer rim body 13 are connected using fastening members or the like.

Further, since the plurality of first elastic connecting plates 21 are disposed in the tire circumferential direction at predetermined one positions in the tire width direction H and the plurality of second elastic connecting plates 22 are disposed in the tire circumferential direction at other positions in the tire width direction H, interference between the connecting members 15 neighboring in the tire circumferential direction can be suppressed, and generation of restriction in disposition number can be suppressed.

In addition, since the one end section 21a of the first elastic connecting plate 21 connected to the outer rim body 13 is disposed closer to one side in the tire circumferential direction than the other end section 21b connected to the inner rim body 12 and the one end section 22a of the second elastic connecting plate 22 connected to the outer rim body 13 is disposed closer to the other side in the tire circumferential direction than the other end section 22b connected to the inner rim body 12, when an external force is applied to the non-pneumatic tire 1, the first elastic connecting plate 21 and the second elastic connecting plate 22 can be easily elastically deformed, and flexibility can be provided to the non-pneumatic tire 1 to secure good ride comfort.

Further, in the first split case body 31 and the second split case body 32, since any ones extending in a constant direction of the plurality of first elastic connecting plates 21 and the plurality of second elastic connecting plates 22 in the side view of the tire are disposed between the outer rim body 13 and the inner rim body 12, and the others extending in the other direction are not disposed, when the ring member 14 and the connecting member 15 are formed, first, as the first and second split case bodies 31 and 32 that can be easily formed with a simple structure are separately formed, in comparison with the case in which a case body having a complex structure in which both of the ring member 14 and the connecting members 15 are integrally formed with each other, the non-pneumatic tire 1 can be easily and securely formed.

In addition, since the first and second split case bodies 31 and 32 are integrally formed through casting or injection molding, the non-pneumatic tire 1 can be more easily formed.

Moreover, as described above, in the split case bodies 31 and 32, since only one of the elastic connecting plates 21 and 22 is disposed between the outer rim body 13 and the inner rim body 12, when the split case bodies 31 and 32 are integrally formed through casting or injection molding, a molten metal or a molten resin can securely easily arrive at corners in a mold, a structure of a mold can be suppressed from being complicated, and the non-pneumatic tire 1 can be more easily securely formed.

In addition, since the connecting members 15 are line-symmetrically formed with respect to the imaginary line L in the side view of the tire, generation of a difference between a spring constant along one side in the tire circumferential direction and a spring constant along the other side in the non-pneumatic tire 1 can be suppressed, and good controllability can be provided.

(Second embodiment)

Next, a non-pneumatic tire of a second embodiment according to the present invention will be described with reference to FIG. 6.

Further, in the second embodiment, the same portions as the components of the first embodiment are designated by the same reference numerals, description thereof will be omitted, and only different points will be described.

In a non-pneumatic tire 40 according to the embodiment, the size H1 of the one end section 15a of the connecting member 15 in the tire width direction H is smaller than the size of the outer rim body 13 in the tire width direction H. The size H2 of the other end section 15b of the connecting member 15 in the tire width direction H is equal to the size of the attachment body 11 in the tire width direction H and the size of the inner rim body 12 in the tire width direction H.

In both of the elastic connecting plates 21 and 22, an interval in the tire width direction H of the inside edges 21g and 22g in the tire width direction H is gradually decreased from the one end section 15a toward the other end section 15b of the connecting member 15. The inside edges 21g and 22g of both of the elastic connecting plates 21 and 22 in the tire width direction H are gradually directed inward in the tire width direction H from the one end section 15a toward the other end section 15b of the connecting member 15, and smoothly extend with no step. The inside edges 21g and 22g of both of the elastic connecting plates 21 and 22 in the tire width direction H are linearly formed with respect to a reference line S in the front view.

As described above, according to the non-pneumatic tire 40 of the embodiment, the same effect as the first embodiment can be exhibited.

In addition, since the size H2 of the other end section 15b of the connecting member 15 in the tire width direction H is equal to the size of the attachment body 11 in the tire width direction H, a load from the attachment body 11 can be securely received at the other end section 15b of the connecting member 15.

In addition, in both of the elastic connecting plates 21 and 22, since an interval in the tire width direction H of the inside edges 21g and 22g in the tire width direction H is gradually decreased from the one end section 15a toward the other end section 15b of the connecting member 15, durability of the connecting member 15 can be improved by preventing stress concentration from occurring on both of the inside edges 21g and 22g of the elastic connecting plates 21 and 22 in the tire width direction H, the connecting member 15 can be easily formed, and the weight of the connecting member 15 can be further reduced.

(Third embodiment)

Next, a non-pneumatic tire of a third embodiment according to the present invention will be described with reference to FIG. 7.

Further, in the third embodiment, the same portions as the components of the second embodiment are designated by the same reference numerals, description thereof will be omitted, and only different points will be described.

In a non-pneumatic tire 50 according to the embodiment, in both of the elastic connecting plates 21 and 22, an interval in the tire width direction H of the inside edges 21g and 22g in the tire width direction H is gradually increased, and then gradually decreased from the one end section 15a toward the other end section 15b of the connecting member 15. In the front view, the inside edges 21g and 22g of both of the elastic connecting plates 21 and 22 in the tire width direction H gradually linearly extend outward in the tire width direction H, and then gradually linearly extend inward in the tire width direction H from the one end section 15a toward the other end section 15b of the connecting member 15.

As described above, according to the non-pneumatic tire 50 of the embodiment, the same effect as the first embodiment can be exhibited.

In addition, since the size H2 of the other end section 15b of the connecting member 15 in the tire width direction H is equal to the size of the attachment body 11 in the tire width direction H, a load from the attachment body 11 can be securely received at the other end section 15b of the connecting member 15.

(Fourth embodiment)

Next, a non-pneumatic tire of a fourth embodiment according to the present invention will be described with reference to FIG. 8.

Further, in the fourth embodiment, the same portions as the components of the first embodiment are designated by the same reference numerals, description thereof will be omitted, and only different points will be described.

In a non-pneumatic tire 60 according to the embodiment, the size H1 of the one end section 15a of the connecting member 15 in the tire width direction H is smaller than the size of the outer rim body 13 in the tire width direction H. The size H2 of the other end section 15b of the connecting member 15 in the tire width direction H is equal to the size of the attachment body 11 in the tire width direction H and the size of the inner rim body 12 in the tire width direction H.

The size of the connecting member 15 in the tire width direction H is gradually reduced from the one end section 15a toward the other end section 15b of the connecting member 15. Both of the outside edges 15c of the connecting member 15 in the tire width direction H are gradually directed inward in the tire width direction H from the one end section 15a toward the other end section 15b of the connecting member 15. In the front view, both of the outside edges 15c of both of the elastic connecting plates 21 and 22 in the tire width direction H linearly extend to be gradually directed inward in the tire width direction H, and then linearly extend parallel to a reference line S via a bent section from the one end section 15a toward the other end section 15b of the connecting member 15.

As described above, according to the non-pneumatic tire 60 of the embodiment, the same effect as the first embodiment can be exhibited.

In addition, since the size H2 of the other end section 15b of the connecting member 15 in the tire width direction H is equal to the size of the attachment body 11 in the tire width direction H, a load from the attachment body 11 can be securely received at the other end section 15b of the connecting member 15.

Further, the technical spirit of the present invention is not limited to the embodiment but various modifications may be made without departing from the spirit of the present invention.

For example, the curve direction of the curved sections 21d to 21f in the first elastic connecting plate 21 and the curve direction of the curved sections 22d to 22f in the second elastic connecting plate 22 may be appropriately varied without being limited to the embodiment.

In addition, in the embodiment, while a configuration in which the first elastic connecting plate 21 and the second elastic connecting plate 22 are each provided as the connecting member 15 has been described, instead of this, a configuration in which the plurality of first elastic connecting plates 21 and the plurality of second elastic connecting plates 22 are provided on the one connecting member 15 at different positions in the tire width direction H may be employed. In this case, outside edges of the connecting member in the tire width direction are constituted by an edge of one side disposed closest to one side of the plurality of elastic connecting plates in the tire width direction and an edge of the other side disposed closest to the other side in the tire width direction.

Further, one connecting member may be constituted by one elastic connecting plate.

In addition, instead of the embodiment, for example, the other end sections 21b and 22b of the first elastic connecting plate 21 and the second elastic connecting plate 22 may be connected at opposite positions with the axis O sandwiched therebetween on the outer circumferential surface of the inner rim body in the tire radial direction, or may be connected to the one end sections 21a and 22a of the first elastic connecting plate 21 and the second elastic connecting plate 22 at opposite positions in the tire radial direction on the outer circumferential surface of the inner rim body 12.

In addition, instead of the embodiment, the one end sections 21a and 22a of both of the connecting plates 21 and 22 may be connected at different positions in the tire circumferential direction on the inner circumferential surface of the outer rim body 13.

In addition, in the embodiment, while the size of the connecting member 15 in the tire width direction H is gradually reduced from the one end section 15a toward the other end section 15b of the connecting member 15, the present invention is not limited thereto. For example, the size of the connecting member in the tire width direction is gradually increased and then gradually decreased from one end section toward the other end section of the connecting member.

Further, a gap in the tire width direction H may be formed between the inner rim body 12 of the one side split ring member 23 and the inner rim body 12 of the other side split ring member 24.

In addition, the ring member 14 may be split into three or more parts in the tire width direction H, or may not be split.

Further, the first and second split case bodies 31 and 32 are not limited to the above-mentioned embodiment but may be formed through, for example, cutting or the like.

Furthermore, the ring member 14 and the plurality of connecting members 15 may be integrally formed with each other.

In addition, a configuration in which the inner rim body 12 is split with a gap in the tire width direction H but the outer rim body 13 is not split may be employed.

In addition, in the embodiment, while the width of the inner rim body 12 is smaller than the width of the outer rim body 13, the present invention is not limited thereto and, for example, both of the rim bodies may be equal in width.

In addition, the ring member 14 and the connecting member 15 are not limited to the member shown in the embodiment.

For example, the outer rim body and the attachment body may be connected via the connecting member in a relatively elastically displaceable manner without the inner rim body.

In addition, the components of the above-mentioned embodiment may be appropriately substituted with known components without departing from the spirit of the present invention, or the above-mentioned variants may be appropriately combined.

A verification test with respect to the above-mentioned effect was performed.

Figure 8:
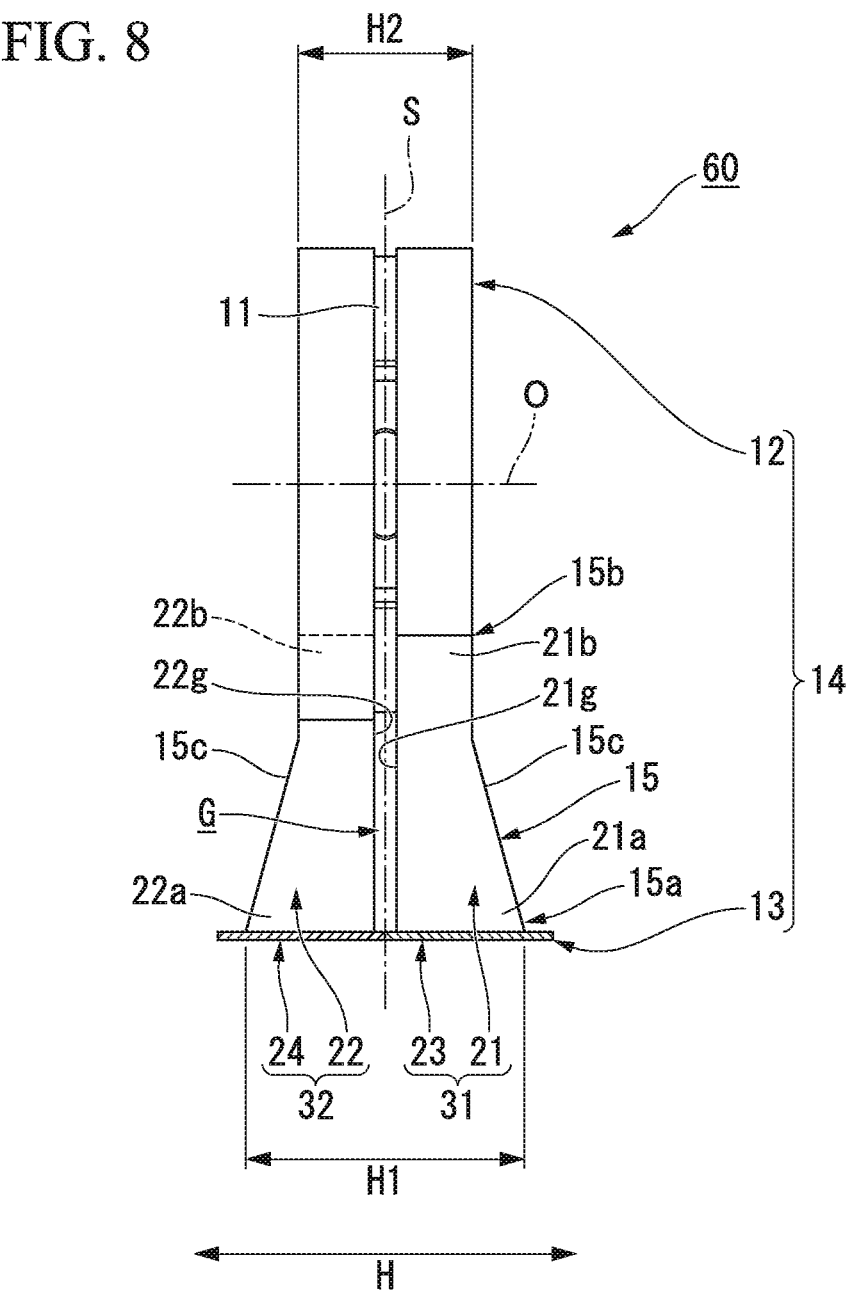
FIG. 8 is a front view showing a part of a non-pneumatic tire of a fourth embodiment according to the present invention when seen from the outside in the tire radial direction.

The non-pneumatic tire 1 shown in FIGS. 1 to 5B was employed as Example 1, the non-pneumatic tire 40 shown in FIG. 6 was employed as Example 2, the non-pneumatic tire 50 shown in FIG. 7 was employed as Example 3, and the non-pneumatic tire 60 shown in FIG. 8 was employed as Example 4.

Figure 9:
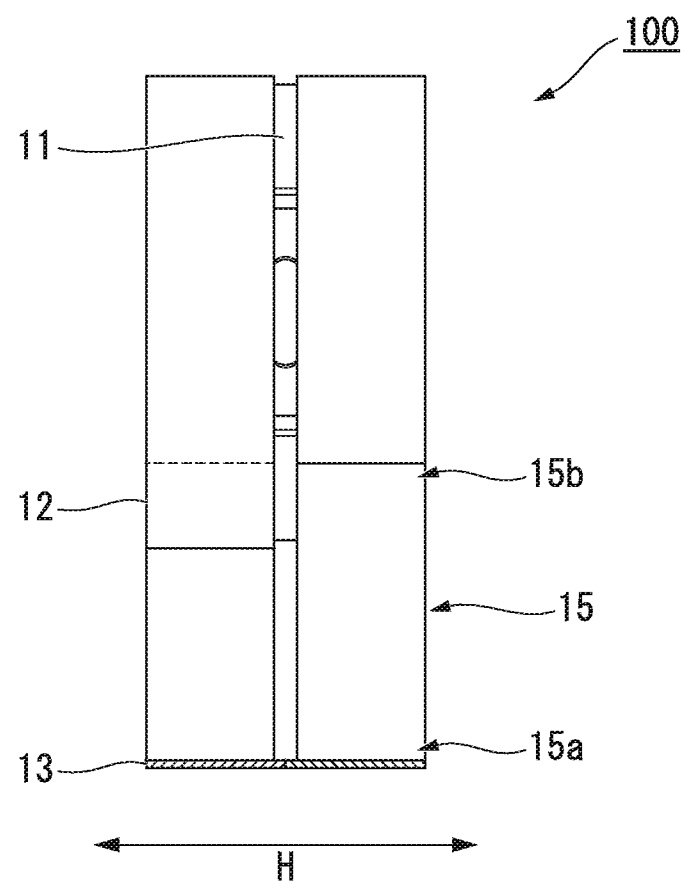
FIG. 9 is a front view showing a part of a non-pneumatic tire of Comparative Example used in a verification test when seen from the outside in the tire radial direction.

The non-pneumatic tire 100 shown in FIG. 9 was employed as Comparative Example. In the non-pneumatic tire 100 shown in FIG. 9, the size of the connecting member 15 in the tire width direction H is equal throughout the entire length from the one end section 15a toward the other end section 15b of the connecting member 15. The sizes of the connecting member 15, the outer rim body 13, the inner rim body 12 and the attachment body 11 in the tire width direction H are equal to each other.

Further, in each of the tires, sizes of the outer rim body in the tire width direction are different, and in the non-pneumatic tires according to Example 2 to Example 4, the size of the outer rim body in the tire width direction was increased to be larger than those of the non-pneumatic tires according to Example 1 and Comparative Example.

Then, in each of the tires, tests on weight, durability and brake performance of the outer rim body were performed, and then test results of Examples 1 to 4 were index-estimated using test results of Comparative Example as a reference value 100. In index estimation of the weight, a lower numerical value indicates a better result, and in index estimation of durability and brake performance, a higher numerical value indicates a better result.

The results are shown in Table 1.

TABLE 1

|  | Comparative Example | Example 1 | Example 2 | Example 3 | Example 4 |
|---|---|---|---|---|---|
| Weight | 100 | 85 | 80 | 85 | 90 |
| Durability | 100 | 96 | 93 | 98 | 100 |
| Brake performance | 100 | 100 | 105 | 110 | 110 |

According to the results, it was confirmed that the non-pneumatic tires according to Examples 1 to 4 can secure durability of the outer rim body while attempting a decrease in weight to be smaller than the non-pneumatic tire according to Comparative Example. In addition, it was confirmed that brake performance is improved by increasing a size of the outer rim body in the tire width direction.

INDUSTRIAL APPLICABILITY

The non-pneumatic tire of the present invention secures durability of the outer rim body while attempting a decrease in weight.

DESCRIPTION OF REFERENCE SIGNS 1, 40, 50, 60 non-pneumatic tire
11 attachment body
12 inner rim body
13 outer rim body
15 connecting member
15a one end section
15b other end section
21 first elastic connecting plate
22 second elastic connecting plate
H tire width direction

The invention claimed is:

1. A non-pneumatic tire comprising:
an attachment body attached to an axle;
an outer rim body configured to surround the attachment body from the outside in a tire radial direction; and
a connecting member configured to connect the attachment body and the outer rim body in a displaceable manner,
wherein, the outer rim body and the connecting member are integrally formed of a resin material,
in the connecting member, a size of one end section connected to the outer rim body in a tire width direction is larger than a size of the other end section connected to the attachment body in a tire width direction,
the connecting member comprises a first elastic connecting plate and a second elastic connecting plate disposed at different positions in the tire width direction,
in both of the elastic connecting plates, inside edges in the tire width direction are spaced apart from each other in the tire width direction, and
in both of the elastic connecting plates, an interval in the tire width direction of inside edges in the tire width direction has a portion which gradually decreases from the one end section toward the other end section.

2. The non-pneumatic tire according to claim 1, wherein the size of the connecting member in the tire width direction is gradually decreased from the one end section toward the other end section.

3. The non-pneumatic tire according to claim 1, wherein, the interval is gradually decreased from the one end section toward the other end section.

4. The non-pneumatic tire according to claim 1, wherein an inner rim body connected to the outer rim body via the connecting member is fitted onto the attachment body, and
a size of the inner rim body in the tire width direction is smaller than a size of the outer rim body in the tire width direction.

5. The non-pneumatic tire according to claim 2, wherein, the interval is gradually decreased from the one end section toward the other end section.

6. The non-pneumatic tire according to claim 2, wherein an inner rim body connected to the outer rim body via the connecting member is fitted onto the attachment body, and
a size of the inner rim body in the tire width direction is smaller than a size of the outer rim body in the tire width direction.

7. The non-pneumatic tire according to claim 3, wherein an inner rim body connected to the outer rim body via the connecting member is fitted onto the attachment body, and
a size of the inner rim body in the tire width direction is smaller than a size of the outer rim body in the tire width direction.

8. The non-pneumatic tire according to claim 1, wherein the interval is gradually increased, and then gradually decreased from the one end section toward the other end section.

9. The non-pneumatic tire according to claim 2, wherein the interval is gradually increased, and then gradually decreased from the one end section toward the other end section.

10. The non-pneumatic tire according to claim 4, wherein the interval is gradually increased, and then gradually decreased from the one end section toward the other end section.

11. The non-pneumatic tire according to claim 6, wherein the interval is gradually increased, and then gradually decreased from the one end section toward the other end section.

* * * * *